US008615337B1

(12) United States Patent
McCusker et al.

(10) Patent No.: US 8,615,337 B1
(45) Date of Patent: Dec. 24, 2013

(54) SYSTEM SUPPORTING FLIGHT OPERATIONS UNDER INSTRUMENT METEOROLOGICAL CONDITIONS USING PRECISION COURSE GUIDANCE

(75) Inventors: Patrick D. McCusker, Walker, IA (US); Sarah Barber, Cedar Rapids, IA (US); Felix B. Turcios, Cedar Rapids, IA (US); Douglas A. Bell, Marion, IA (US); Richard D. Jinkins, Rewey, WI (US); Timothy J. Etherington, Cedar Rapids, IA (US); Michael J. Krenz, Cedar Rapids, IA (US); Charles B. Dirks, Swisher, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1401 days.

(21) Appl. No.: 12/284,787

(22) Filed: Sep. 25, 2008

(51) Int. Cl.
| G06F 7/70 | (2006.01) |
| G06F 19/00 | (2011.01) |
| G06G 7/00 | (2006.01) |
| G06G 7/76 | (2006.01) |

(52) U.S. Cl.
USPC ............... 701/14; 701/1; 701/3; 701/4; 701/9

(58) Field of Classification Search
USPC .......................................................... 701/16
See application file for complete search history.

(56) References Cited

U.S. PATENT DOCUMENTS

| 3,373,423 | A | * | 3/1968 | Levy | 342/65 |
| 3,484,549 | A | * | 12/1969 | Braithwaite et al. | 348/117 |
| 3,666,929 | A | * | 5/1972 | Menn | 701/16 |
| 3,781,891 | A | * | 12/1973 | Moose | 342/411 |
| 3,786,505 | A | * | 1/1974 | Rennie | 342/33 |
| 5,657,009 | A | * | 8/1997 | Gordon | 340/968 |
| 5,661,486 | A | * | 8/1997 | Faivre et al. | 342/33 |
| 5,719,567 | A | * | 2/1998 | Norris | 340/953 |
| 5,839,080 | A | * | 11/1998 | Muller et al. | 701/9 |
| 5,884,223 | A | * | 3/1999 | Tognazzini | 701/301 |
| 6,088,634 | A | * | 7/2000 | Muller et al. | 701/9 |
| 6,088,654 | A | * | 7/2000 | Lepere et al. | 701/301 |
| 6,154,151 | A | * | 11/2000 | McElreath et al. | 340/970 |
| 6,199,008 | B1 | * | 3/2001 | Aratow et al. | 701/120 |
| 6,233,522 | B1 | * | 5/2001 | Morici | 701/408 |
| 6,263,263 | B1 | * | 7/2001 | Shehi et al. | 701/3 |
| 6,281,832 | B1 | * | 8/2001 | McElreath | 342/65 |
| 6,292,721 | B1 | * | 9/2001 | Conner et al. | 701/9 |
| 6,311,108 | B1 | * | 10/2001 | Ammar et al. | 701/16 |
| 6,317,663 | B1 | * | 11/2001 | Meunier et al. | 701/16 |
| 6,317,690 | B1 | * | 11/2001 | Gia | 701/301 |
| 6,380,870 | B1 | * | 4/2002 | Conner et al. | 340/970 |
| 6,430,480 | B1 | * | 8/2002 | Ammar et al. | 701/16 |
| 6,438,469 | B1 | * | 8/2002 | Dwyer et al. | 701/16 |
| 6,445,310 | B1 | * | 9/2002 | Bateman et al. | 340/970 |
| 6,456,940 | B1 | * | 9/2002 | Higgins | 701/301 |
| 6,484,072 | B1 | * | 11/2002 | Anderson et al. | 701/9 |
| 6,512,976 | B1 | * | 1/2003 | Sabatino et al. | 701/469 |
| 6,678,588 | B2 | * | 1/2004 | He | 701/3 |

(Continued)

*Primary Examiner* — Bhavesh V Amin
(74) *Attorney, Agent, or Firm* — Donna P. Suchy; Daniel M. Barbieri

(57) ABSTRACT

The present examples provide circuits, systems, processes, and the like for providing precision course guidance, typically for improved positive course guidance below published minimum descent altitude or decision altitude, including just in time calculations of obstacle free flight paths. The calculated flight path may be presented in the context of a synthetic scene of the environment surrounding the aircraft. To provide precision course guidance, exemplary avionics systems, processes and the like, as described below may be utilized.

18 Claims, 12 Drawing Sheets

(56) References Cited

U.S. PATENT DOCUMENTS

| | | | |
|---|---|---|---|
| 6,690,299 B1* | 2/2004 | Suiter | 340/973 |
| 6,711,478 B2* | 3/2004 | Hilb | 701/8 |
| 6,720,891 B2* | 4/2004 | Chen et al. | 340/969 |
| 6,782,312 B2* | 8/2004 | He | 701/3 |
| 6,785,594 B1* | 8/2004 | Bateman et al. | 701/9 |
| 6,970,107 B2* | 11/2005 | Gannett | 340/967 |
| 6,980,892 B1* | 12/2005 | Chen et al. | 701/9 |
| 6,995,690 B1* | 2/2006 | Chen et al. | 340/974 |
| 7,440,591 B1* | 10/2008 | McCusker | 382/109 |
| 7,463,954 B1* | 12/2008 | He | 701/3 |
| 7,477,164 B1* | 1/2009 | Barber | 340/945 |
| 7,522,977 B2* | 4/2009 | Foucart et al. | 701/16 |
| 7,580,776 B1* | 8/2009 | McCusker et al. | 701/3 |
| 7,619,556 B1* | 11/2009 | McCusker | 342/33 |
| 7,689,324 B1* | 3/2010 | Krenz et al. | 701/1 |
| 7,715,955 B2* | 5/2010 | Tatham et al. | 701/16 |
| 7,715,978 B1* | 5/2010 | Wenger et al. | 701/448 |
| 7,751,951 B2* | 7/2010 | Pitard et al. | 701/15 |
| 7,783,427 B1* | 8/2010 | Woodell et al. | 701/301 |
| 7,787,999 B1* | 8/2010 | Barber | 701/14 |
| 7,962,254 B2* | 6/2011 | Bouchet et al. | 701/4 |
| 8,099,202 B1* | 1/2012 | Krenz et al. | 701/16 |
| 2001/0035831 A1* | 11/2001 | Block | 340/970 |
| 2002/0161514 A1* | 10/2002 | Shinagawa | 701/209 |
| 2003/0004641 A1* | 1/2003 | Corwin et al. | 701/301 |
| 2003/0193410 A1* | 10/2003 | Chen et al. | 340/971 |
| 2003/0195672 A1* | 10/2003 | He | 701/3 |
| 2003/0200024 A1* | 10/2003 | Poreda | 701/120 |
| 2003/0222887 A1* | 12/2003 | Wilkins et al. | 345/618 |
| 2003/0229426 A1* | 12/2003 | Griffin et al. | 701/3 |
| 2004/0078122 A1* | 4/2004 | Pippenger | 701/3 |
| 2004/0160341 A1* | 8/2004 | Feyereisen et al. | 340/970 |
| 2004/0215372 A1* | 10/2004 | Bateman et al. | 701/1 |
| 2005/0182528 A1* | 8/2005 | Dwyer et al. | 701/3 |
| 2006/0004496 A1* | 1/2006 | Tucker et al. | 701/4 |
| 2006/0238376 A1* | 10/2006 | Khatwa | 340/970 |
| 2006/0238402 A1* | 10/2006 | Khatwa | 342/29 |
| 2006/0250280 A1* | 11/2006 | Chen et al. | 340/974 |
| 2006/0253232 A1* | 11/2006 | Gerrity et al. | 701/16 |
| 2007/0001874 A1* | 1/2007 | Feyereisen et al. | 340/995.1 |
| 2007/0038339 A1* | 2/2007 | Shirley et al. | 701/14 |
| 2007/0129855 A1* | 6/2007 | Coulmeau | 701/3 |
| 2007/0174005 A1* | 7/2007 | Bitar et al. | 701/211 |
| 2008/0262664 A1* | 10/2008 | Schnell et al. | 701/4 |
| 2008/0262665 A1* | 10/2008 | Coulmeau et al. | 701/16 |
| 2008/0269966 A1* | 10/2008 | Markiton et al. | 701/16 |
| 2009/0024261 A1* | 1/2009 | Rouquette et al. | 701/16 |
| 2009/0043434 A1* | 2/2009 | Deker | 701/16 |

* cited by examiner

SYSTEM SUPPORTING FLIGHT OPERATIONS UNDER INSTRUMENT METEOROLOGICAL CONDITIONS USING PRECISION COURSE GUIDANCE

TECHNICAL FIELD

This description relates generally to avionics systems and more specifically to navigation, landing, and departure systems.

BACKGROUND

Take off and landing procedures and other flight operations, can vary depending upon the type of weather conditions present, if it is day or night, the terrain, and the like. Adverse conditions may call for instrument landings which may be more constrained than a landing in clear conditions. For example the path of an aircraft may be more constrained. If the aircraft misses a landing it may have to go back to a known position to reinitiate the procedure, even if a more efficient path might be possible. This type of operation can be inefficient, for the aircraft, and for air traffic control, especially with increased air traffic at airports, and in the skies.

The presently available types of path choices may be due to the limitations of the aircraft instruments during operations under adverse conditions and providing a corresponding safety buffer for the aircraft. Under such atmospheric conditions it may be desirable to provide an improvement to such exemplary instrumented flight procedures.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides examples of circuits, systems, processes, and the like for providing precision course guidance below published minima for approach, missed-approach, and departure, including just in time calculations of obstacle free flight paths. Visualization of the calculated flight path may be presented in the context of a synthetic scene of the environment surrounding the aircraft. To provide precision course guidance, exemplary avionics systems, processes and the like, as described below may be utilized.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
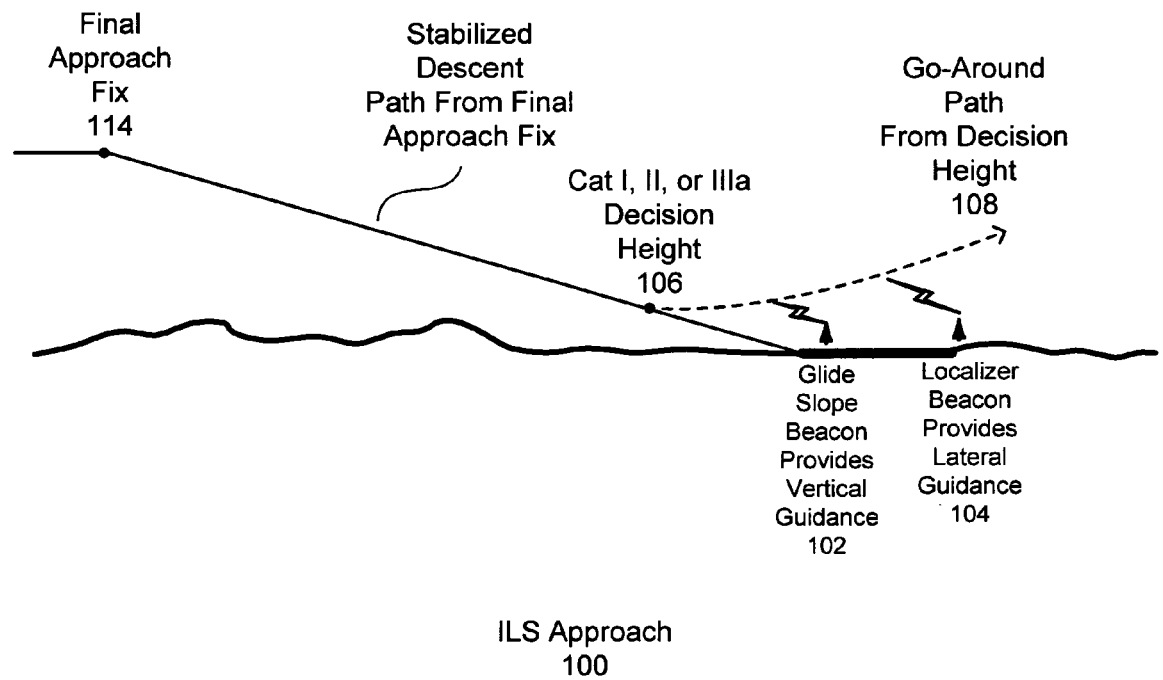
FIG. 1 shows a typical instrument landing system including decision heights dependent upon the category of landing.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe an aerospace navigation system. Although the present examples are described and illustrated herein as being implemented in an aircraft system, the system described is provided as an example and not a limitation. As those skilled in the art will appreciate, the present examples are suitable for application in a variety of different types of avionics systems such as those in military, commercial, private planes and the like.

The examples provided of precision course guidance can reduce flight technical error ("FTE") resulting in reduced operating minima at terrain-challenged and obstacle-challenged airports, thus tending to improve the landing and take off process. In improving flight operations as described in the following examples several flight operational criteria may be of interest, including those dealing with a missed approach point, terrain clearance on approach, and terrain clearance on a missed approach.

In aviation, visual meteorological conditions ("VMC") are atmospheric conditions under which aircraft operation governed by visual flight rules can be allowed. Typically under these conditions pilots have sufficient visibility to fly the aircraft maintaining visual separation from terrain and other aircraft. Visual meteorological conditions are in contrast to instrument meteorological conditions ("IMC") where visibility is typically reduced such that visual flight rules typically do not apply. The boundary criteria between instrument meteorological conditions and visual meteorological conditions are known as the visual meteorological conditions minima.

Instrument meteorological conditions, or "blind flying", is typically an aviation term that may describe weather conditions where pilots fly primarily by reference to instruments, under instrument flight rules ("IFR"), rather than by outside visual references, such as under visual flight rules. Typically, flying under instrument meteorological conditions means flying in cloud, bad weather or at night.

Instrument meteorological conditions should not be confused with instrument flight rules. Instrument meteorological conditions describe the actual weather conditions, while instrument flight rules describes the rules under which the aircraft is typically being operated. For example aircraft can fly instrument flight rules in clear weather, for operational reasons, when flying in airspace where flights under visual flight rules are not permitted, or the like. For example commercial flights are typically operated solely under instrument flight rules.

Flight operations under instrument meteorological conditions are typically limited to published instrument flight rules procedures. The instrument flight procedure allows the pilot to fly the aircraft using instruments to a missed approach point ("MAP") where the pilot must make visual reference to the runway environment thereby initiating a visual flight segment or the pilot must initiate a missed approach. The MAP is a decision altitude ("DA") for approaches using vertical guidance or a unique location at the minimum descent altitude ("MDA") for approaches with out vertical guidance. The location for the MAP at MDA is defined a specific geographic location or as a time from the Final Approach Fix. In terrain challenged environments, the DA or MDA may be thousands of feet above the runway altitude. This can severely limit the number of flights that can successfully land at an airport.

Instrument Approach Procedures are designed to enable aircraft to approach a runway for the purpose of landing when it may not be possible to navigate using the naked eye looking out the cockpit windows to obtain the same desired result. There are many rules related to the design of the approaches such that the intended flight path remain clear of obstacles, not exceed certain geometric limits, and the like.

Even with the advent of synthetic vision systems, it may still be necessary to fly predetermined routes to reach runways when in non-visual flight rules conditions. Because of the typically regimented nature of approach procedures, such as given by the exemplary Federal Aviation Administration's ("FAA") Terminal Instrument Procedures ("TERPS"), pilots can be required to fly to specified areas to gain access to an approach procedure or gate.

In these instances the procedure which is typically fixed, can be mired in weather or may be inconveniently located far from the pilots arrival flight path. In particular the terminal instrument procedures limit the arrival and departure procedures to paths that provide adequate clearance from terrain and fixed obstacles given "lowest common denominator" expectations for aircraft performance, navigation accuracy, and flight technical error.

In particular, precision and non-precision approaches may allow a minimum DA of 200 ft when terrain or obstacles do not significantly restrict approach and departure paths. While in contrast, precision and non-precision approaches at terrain-challenged or obstacle-challenged airports can have a DA or MDA a thousand feet or more above the airport altitude.

A current trend is also that of economic pressure to retire exemplary Cat I instrument landing system infrastructures, which may tend to cause a greater reliance on global positioning system ("GPS"), wide area augmentation systems ("WAAS"), and other equivalent based approaches. Some terrain-challenged airports can have high DAs or MDAs even though they have published GPS approaches. In such increasingly used GPS type systems there are typically no existing concepts or sources for operating procedures to allow approach and missed approach operations below published DA or MDA. In such situations the reduction of operating minima at terrain-challenged and obstacle-challenged airports may be useful.

FIG. 1 shows a typical instrument landing system 100 including decision heights dependent upon the category of landing. The typical Instrument Landing System ("ILS") infrastructure may provide localizer 104 and glide slope beacons 102, to guide the aircraft down to a decision height 106. The localizer beacon 104 typically provides lateral guidance to the aircraft. The glide slope beacon 102 typically provides vertical guidance to the aircraft. If a landing is not made due to unsatisfactory conditions at the decision height 106, a go-around path 108 may be followed to try and land again.

Figure 2:
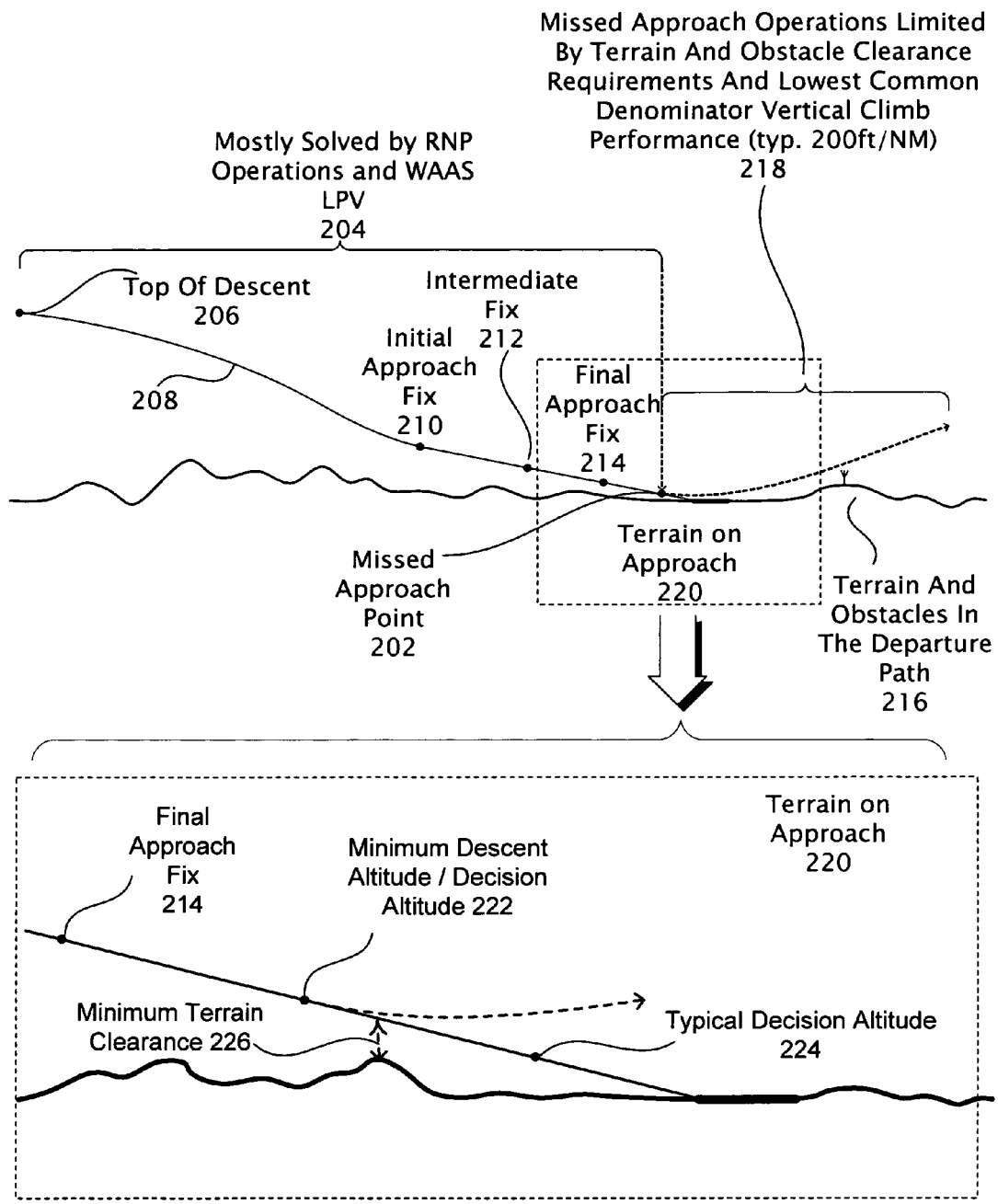
FIG. 2 illustrates the flight operations associated with a missed approach point.

A decision height ("DH"), or equivalently decision altitude ("DA"), 106 may depend upon the category ("Cat") of landing. A Cat I Decision Altitude is typically 200 ft (usually based on Barometric Altitude), A Cat II Decision Height is typically 100 ft (based on Radio Altitude), and a Cat IIIa DH is typically 50 ft (based on Radio Altitude). The examples below may provide a 200 ft decision height 106 in a terrain challenged environment FIG. 2 illustrates the flight operations associated with a missed approach point 202. The missed approach point may vary according to the navigation system utilized. With a navigation system having vertical guidance as shown in this figure, the MAP will be at a DA (see FIG. 3). In a navigation system without vertical guidance, the pilot will descend to an MDA, but then "drive" in towards the airport until reaching the MAP (see FIG. 4).

Here the Decision Altitude (from the top of decent 206 to the missed approach point 202) is mostly dependent upon the accuracy, integrity, and continuity of vertical guidance. This can be predominately solved by applying typical required navigation performance ("RNP") operations, conventionally constructed wide area augmentation systems, and lateral precision performance with vertical guidance ("LPV") to cover a portion of the distance shown 204. A typical approach path 208 may include an initial approach fix 210, an intermediate fix 212, and a final approach fix ("FAF") 214. Alternative solutions for precision navigation provided in the examples below may lower such decision altitudes.

The diagram shows the terrain on approach 220 in an expanded view for clarity. Minimum descent altitude ("MDA")/decision altitude ("DA") 222 is mostly dependent on the terrain and obstacle clearance requirements 218, 226 for the approach or missed approach path as driven by the given terrain 216. The typical decision altitude 224 follows the MDA 222. Precision course guidance may lower Decision Altitudes.

The expanded view 220 illustrates the flight operations associated with terrain clearance on approach from a final approach fix 214 along a stabilized descent path from the FAF 214 to a typical decision altitude 224. If the stabilized descent path does not provide the minimum terrain clearance 226, then the pilot makes visual confirmation of the runway environment by the missed approach point (e.g., a minimum descent altitude or descent altitude 222). If visual confirmation cannot be made, the pilot executes a missed approach. The examples described can allow descent to the typical decision altitude 224 even in those cases where the published approach path does not provide the minimum terrain clearance 226.

The terrain dependent minimum descent altitude or decision altitude 222 defines the altitude of the missed approach point 202, which is above a more typical decision altitude 224. This may be due to terrain along the approach path, providing a minimum terrain clearance 226. Typically, when the terrain close to the approach path penetrates an obstruction clearance surface for the Instrument Approach, the crew must have visibility to clear the terrain.

Figure 3:
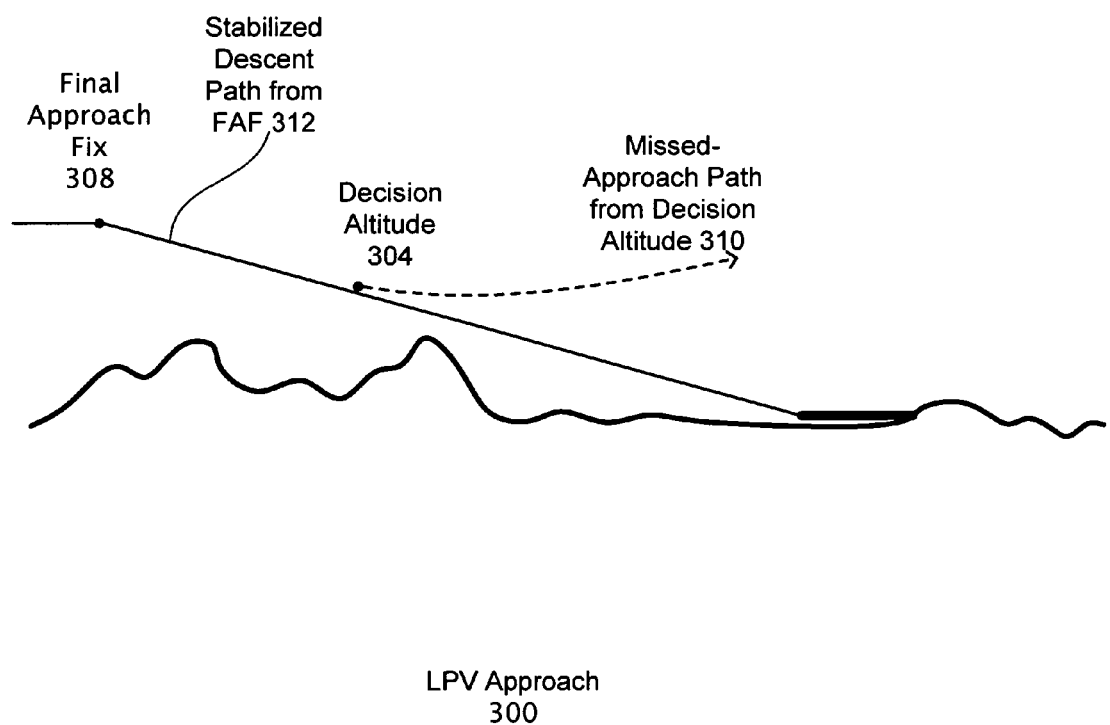
FIG. 3 shows a lateral precision with vertical guidance approach in which vertical guidance may be available.

FIG. 3 shows a lateral precision with vertical guidance ("LPV") approach 300 in which vertical guidance may be available. When vertical guidance is available (e.g., on an LPV approach) the aircraft follows a stabilized approach 312 from FAF 308 to the decision altitude 304 where the pilot typically must have a visual confirmation of the runway environment or must otherwise execute a missed approach 310.

Figure 4:
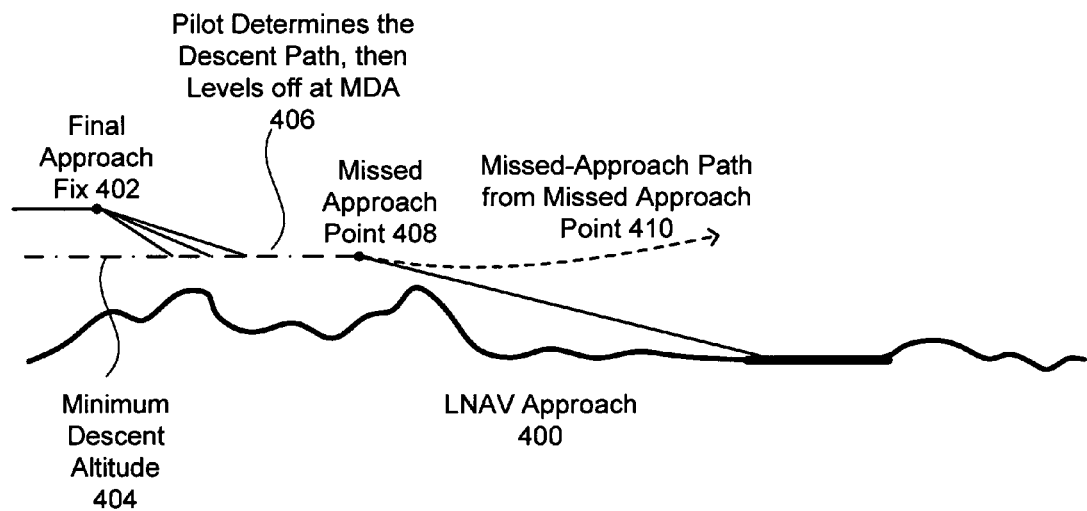
FIG. 4 shows a lateral navigation approach in which vertical guidance may not be available.

FIG. 4 shows a lateral navigation ('LNAV") approach 400 in which vertical guidance may not be available. When vertical guidance is not available (e.g., on an LNAV approach) the pilot typically descends from the FAF 402 to the minimum descent altitude.

The pilot may use a steep or shallow descent path 406 in reaching the MDA 404. The pilot then proceeds in level flight until he/she has visual confirmation of the runway environment, or has reached the missed approach point 408.

At the MAP, the pilot must typically execute a missed approach 410 if visual confirmation is not obtained.

Figure 5:
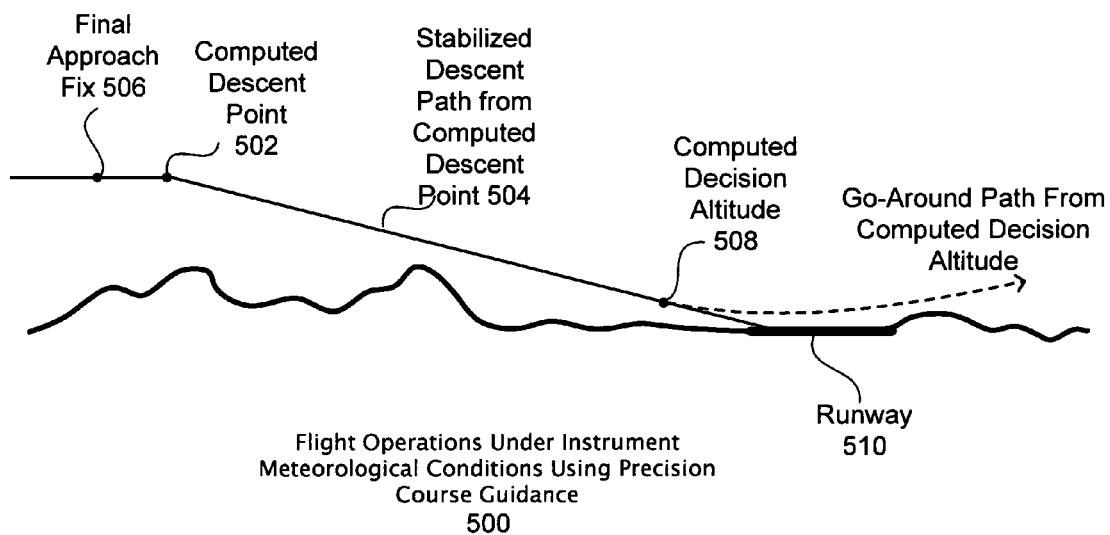
FIG. 5 shows flight operations under instrument meteorological conditions using precision course guidance.

FIG. 5 shows flight operations under instrument meteorological conditions using precision course guidance 500. The examples described below seek to provide the equivalent of a Cat I stabilized approach instead of the published approach. For airports with MDAs, the system can compute a descent point 502 which produces a stabilized approach 504 to the landing zone of the runway (this will typically be somewhat beyond the FAF). The computed descent point 502, may be coincident with the final approach fix 506.

For airports with decision altitudes, the system will use the published stabilized approach from the FAF (computed descent point is at or near the FAF). Note that the new stabilized approach path 504 may "wiggle" laterally to avoid terrain conflicts. A new computed decision altitude 508 may be set to a nominal 200 ft height above the runway 510.

The system for providing flight operations under instrument meteorological conditions using precision course guidance does not typically require ground infrastructure as with the conventional instrument landing system. Approach operations can be performed autonomously (typically using only airborne systems in conjunctions with satellite-based navigation systems). In such a system the approach path 504 may be generated interactively by the pilot, or the approach path may be generated automatically by the system.

The missed-approach and/or departure path may be generated interactively by the pilot as well. And, as before, the missed-approach may be generated semi-automatically, or automatically by the pilot with assistance from the system.

Figure 6:
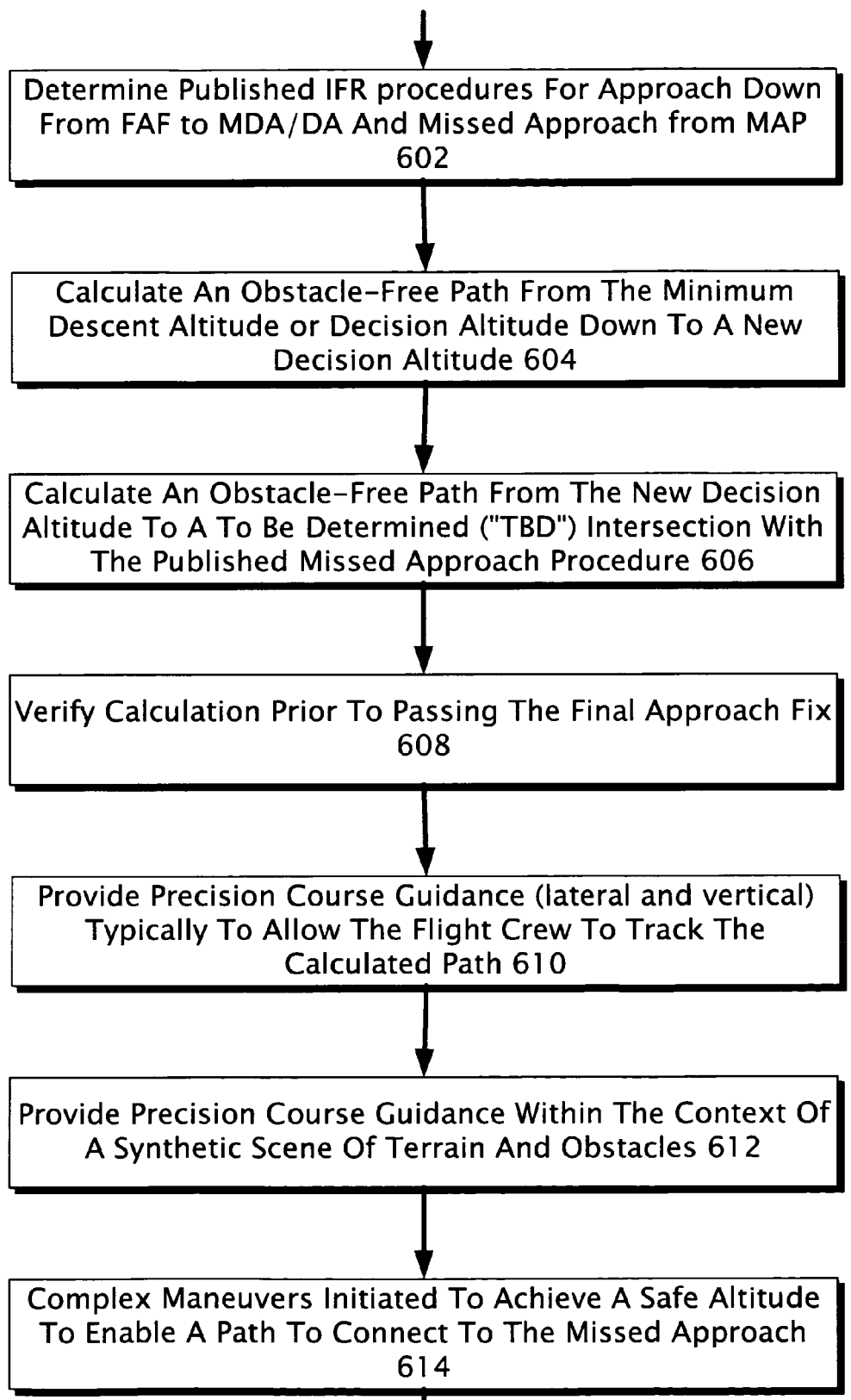
FIG. 6 shows a flow diagram of a method for providing precision course guidance.

FIG. 6 shows a flow diagram of a method for precision course guidance 600. The flow diagram begins with block 602 with the determining of published instrument flight rules procedures (or other equivalent procedures) for approach down from final approach fix ("FAF") to the minimum descent altitude or decision altitude and missed approach from the missed approach point.

The flow diagram continues with block 604 with the calculating of an obstacle-free path from the decision altitude or minimum descent altitude down to a new decision altitude (which may be an exemplary 200 ft, 100 ft, 50 ft or like height above threshold). The flow diagram continues with block 606 with the calculating of an obstacle-free path from the new decision altitude to a, to-be-determined ("TBD") intersection with the published missed approach procedure. The calculated path must typically adhere to the obstacle clearance surface requirements defined in the terminal instrument procedures (or its equivalent), the calculation may be:

a manual process (e.g. a pilot enters waypoints which can be connected into a continuous path by a software application);
  a semi-automated process (e.g. a software application generates a recommended path which typically must be approved by the pilot); or
  a fully-automated process (e.g. a software application generates the path and validates the required obstacle clearance.

The flow diagram continues with block 608 with the verifying of the calculation of the path that must be typically performed prior to passing the final approach fix. The flow diagram continues with block 610 with the providing of precision course guidance (lateral and vertical) typically to allow the flight crew to track the calculated path. The flow diagram continues with block 612 with the providing of precision course guidance within the context of a synthetic scene of terrain and obstacles.

However, the aircraft may not have sufficient performance to climb from the lower decision altitude to intercept the missed approach procedure via a direct path. Thus, the flow diagram continues with block 614 with the initiating of complex maneuvers (e.g. circling climbs) to achieve a safe altitude to enable a path to connect to the missed approach.

The overall process described above may advantageously utilize processes and systems described in the examples below to provide precision course guidance. The examples described develop and present instrument approach procedures literally "on the fly", to provide precision course guidance, with the following components typically utilized in the examples:

1. active onboard real time sensors, that may detect terrain and obstacles (i.e. Radar-enhanced Terrain Awareness Warning System ("RTAWS")) for safety during execution;
2. an onboard database of terrain and obstacles for planning purposes;
3. an onboard database of aircraft performance capabilities (i.e. FMS PERF);
4. a plurality of onboard databases typically for all special use airspace (e.g. P-areas, R-areas, noise abatement areas, Class B, Class C, etc.);
5. instrumentation to "see" the runway environment on say a 1 mile final or its equivalent (i.e. EVS);
6. instrumentation to determine location to a high degree of certainty (e.g. RNP, GPS/WAAS, etc.);
7. instrumentation to provide knowledge of other traffic in the area, and their intentions (i.e. ADS-B); and
8. instrumentation to provide knowledge of typically all of the terminal instrument procedures requirements embedded in the exemplary system.

Then, such a system may be utilized to generate an optimized approach path to final based upon the information, which can be used to first build an approach plate with appropriate minimums, etc. for briefing purposes, and then an approach "on the fly" may be determined.

In short, the exemplary system can utilize onboard database information for terrain, obstacles, performance, etc. to determine the airspace that could be used to shoot an approach including allowing for One Engine Inoperative missed approach, or the like. Then, the system would take into account terminal instrument procedures, current aircraft location, atmospherics such as winds, and the other aircraft activity in the area to build and propose an approach to the crew in the form of an approach chart as well as a loadable set of waypoints for the FMS.

With such a system there may be no need to "flight test" the approach when it is based upon satellite guidance with adequate satellite geometry. Also, there are onboard real time sensors to confirm the database content. By presenting the information to the crew in a familiar chart format, as well as creating a loadable set of waypoints, equivalent accuracy of flight and communication can be provided.

The examples described may alleviate airspace congestion, as they allow the aircraft to be more autonomous in congested terminal airspace by creating the aircraft's own dynamic approach paths when applicable. The "tractor beam follower" example may be useful in congested airspace as well, especially when air traffic control is sequencing arrivals on the same runway as departures that are leaving spaces for departures between arrivals. The examples also provide for onboard real time validation sensors (i.e. RTAWS). Furthermore, the examples may enable small airport and even off-airport operations (e.g. military) where charted procedures do not exist. Finally, by providing the ad-hoc construction of approach procedures, the aircraft can experience a much more efficient capability in its letdown procedures. This can benefit the cost of operations by reducing the overall fuel needed to gain access to the runway. Or, alternatively, the exemplary letdown procedure may be optimized for weather or terrain (turbulence) avoidance. The following three examples, shown in the following, three figures, further illustrate the provision of precision course guidance.

Figure 7:
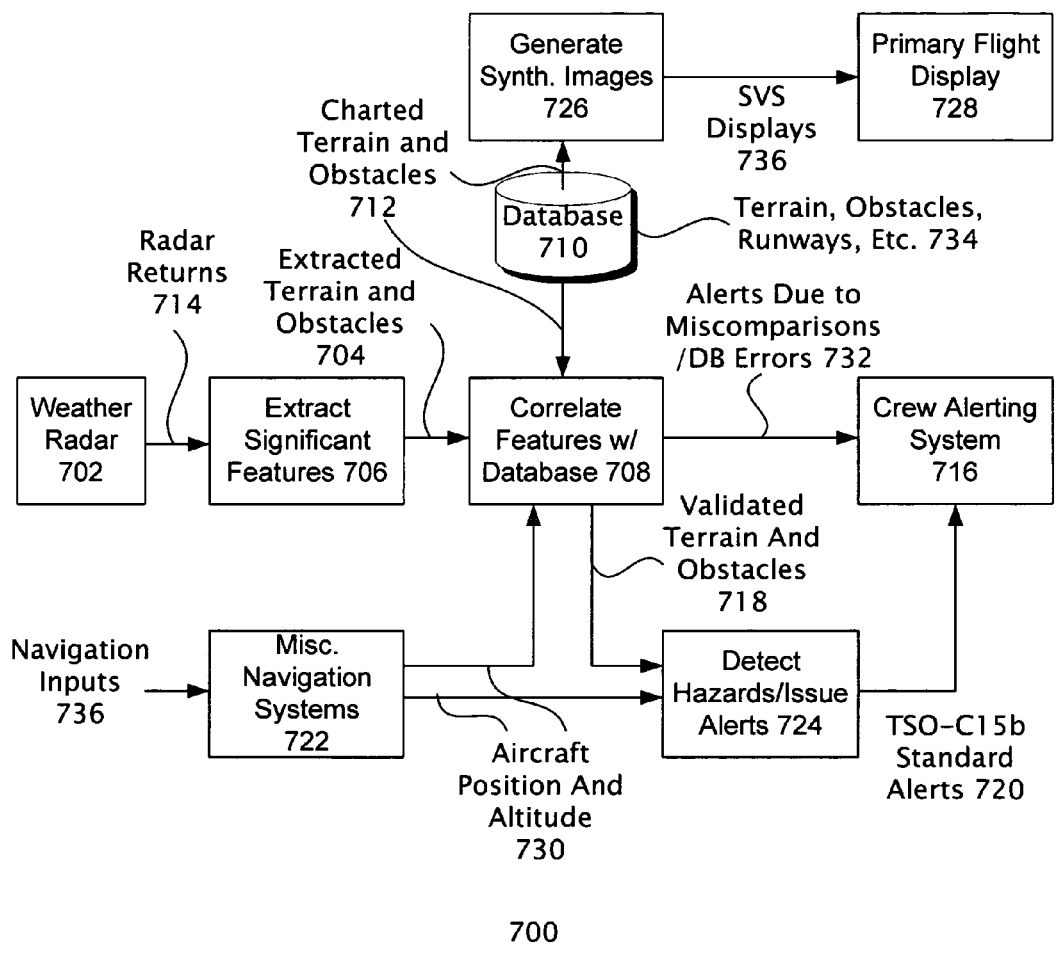
FIG. 7 is a block diagram showing a typically minimal system for providing real-time validation of a synthetic vision system implementing precision course guidance.

FIG. 7 is a block diagram showing a typically minimal system 700 for providing real-time validation of a synthetic vision system ("SVS") implementing precision course guidance. This system 700 provides for the correlation of measured terrain data to information provided from a database. A feature of the example can be the use of a weather radar system 702 to examine the environment (terrain and obstacles) in the projected flight path of the aircraft. First, easily recognized terrain and obstacle features 706 can be extracted from the radar returns 714. These extracted features 704 can then be correlated 708 to one or more databases 710 that can include terrain, charted obstacles, runway information, and the like 734. The correlation process applied at block 708 typically uses aircraft position (latitude, longitude, and altitude) as well as attitude (pitch, roll, and heading) to map radar data to the database 710.

The conventional correlation process implemented at block 708 can then identify errors in the various databases 710 and the navigation system inputs 736. Notification of errors 732 may be transmitted to the crew alerting system 716 and can result in typical aural and/or visual alerts. Validated terrain and obstacle data from the radar 718 can be used to calculate the alerts 720 utilized by the exemplary TCO-C151b Terrain Awareness and Warning System ("TAWS"), or its equivalent 724.

In particular navigation inputs 736 may be coupled to one or more of a plurality of miscellaneous navigation systems 722. The navigation systems may equivalently be conventionally constructed, or may also utilize components described or otherwise incorporated in this document. Aircraft position and altitude data 730 may be coupled to the correlation block 708, and the block 724 to detect hazards and issue alerts. Blocks 708 and 724 may equivalently be conventionally constructed, or may also utilize components described or otherwise incorporated in this document.

Alerts 720 from block 724 may be coupled to crew alerting system 716. Crew alerting system 716 may equivalently be conventionally constructed, or may also utilize components described or otherwise incorporated in this document.

The weather radar 702 couples radar returns 714 to a system to extract significant features 706 of terrain and obstacles 704. The terrain and obstacle data extracted 704 may be coupled to the correlation block 708. Blocks 702 and 706 may equivalently be conventionally constructed, or may also utilize components described or otherwise incorporated in this document. For correlation to the extracted terrain and obstacle data 704, charted terrain and obstacle data 712 can be coupled from a conventionally constructed database 710.

Charted terrain and obstacle information 712 may also be coupled from database 710 to a system for generating images for display 726. The system for generating synthetic (or other) images 726 may equivalently be conventionally constructed, or may also utilize components described or otherwise incorporated in this document. Synthetic vision system displays 736 may also be coupled to a flight display, such as the exemplary primary flight display 728 shown. The flight display 728 may equivalently be conventionally constructed, or may also utilize components described or otherwise incorporated in this document. In the following two examples the components previously described and their interconnection will not be repeated as it may be the same as previously described. The following figure describes a more robust system that can remove errors detected by the correlation process.

Figure 8:
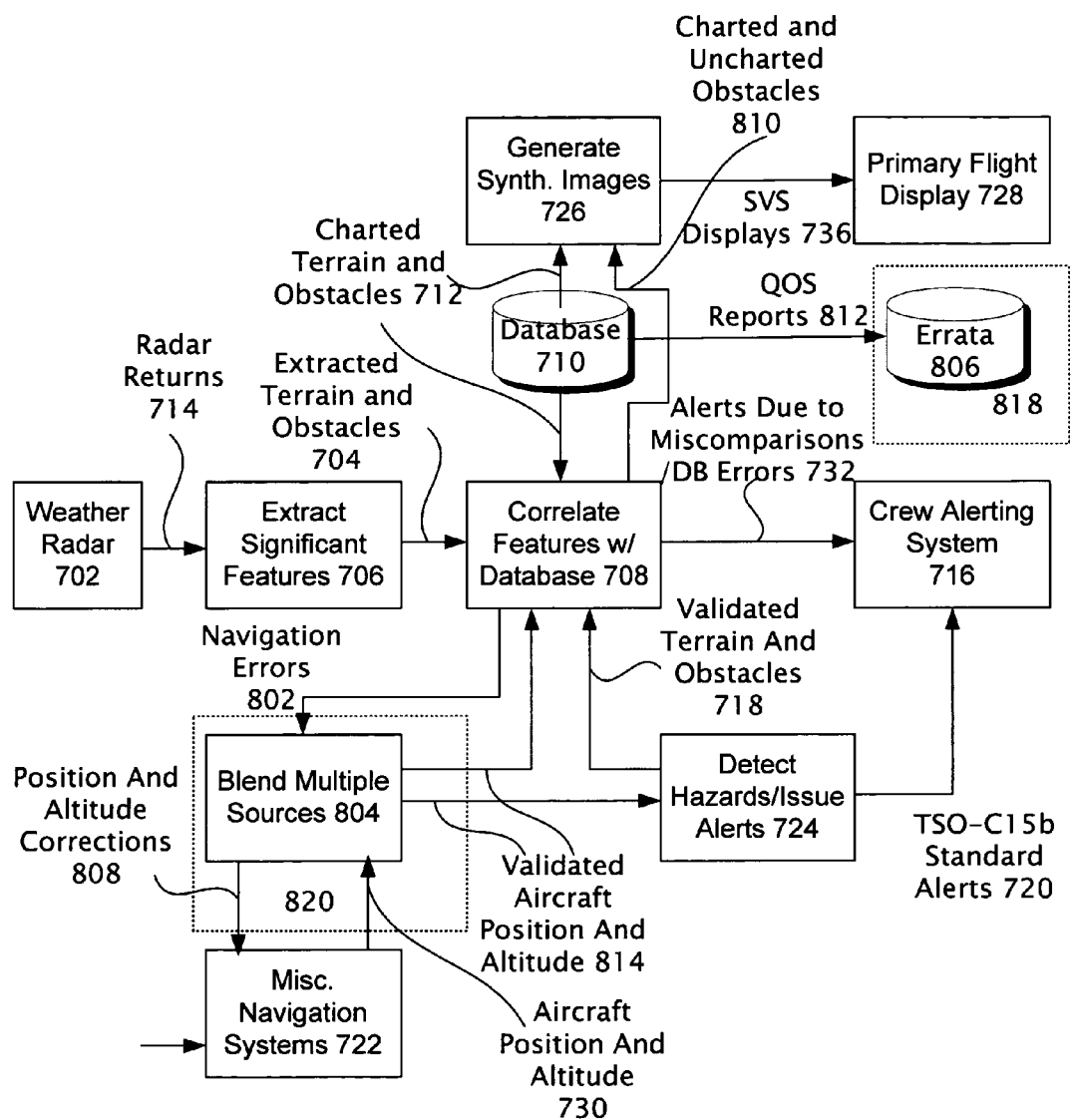
FIG. 8 shows a block diagram of a robust system for providing real-time validation and correction of a synthetic vision system implementing precision course guidance.

FIG. 8 shows a block diagram of a robust system 800 for providing real-time validation and correction of a synthetic vision system implementing precision course guidance. This system 800 adds the capability of correcting the synthetic vision system. As previously described, the correlation of radar-derived terrain and obstacle information 704 to database information 712 may be useful in providing real-time validation and correction of synthetic vision systems. Navigation errors 802 can be fed back into a blending process 804 that combines the inputs from the miscellaneous navigation systems 722. Corrections 808 may also be fed back to the miscellaneous navigation systems 722. Both charted and uncharted obstacles 810 can be sent from the correlation function 708 to the image generation block 726. Uncharted obstacles may be represented so that they are clearly distinguishable from charted obstacles at the flight display 728. Database errors can be recorded in a conventionally constructed errata database 806 and downloaded from the aircraft when convenient. The errors may then be fed in to the database generation process to eliminate the errors from the subsequently generated databases.

An aim of the precision course guidance can be to provide "positive course guidance" to allow the pilot to track a "hazard-free" path on the display 728 until the transition to the visual segment of the approach. Two elements, or components, are utilized: a hazard-free approach path and guidance cues to allow the pilot to track that path. The hazard-free approach path will typically be displayed as a highway-in-the-sky, or its equivalent, within the overall synthetic visual reference frame. The guidance cues may be represented in any convenient formats.

In this example, additional components 818 and 820 may be provided. Here the miscellaneous navigation systems 722 couple aircraft position and altitude 730 to a blended multiple sources system 804. The blended multiple source block 804 may equivalently be conventionally constructed, or may also utilize components described or otherwise incorporated in this document. Altitude and position corrections 808 may be coupled from block 804 to the miscellaneous navigation systems 722. In addition, navigation errors 802 may be coupled from the correlation block to the blended multiple sources block 804. Validated aircraft position and altitude information 814 may be coupled to the correlation block 708, and also to the detect hazards and alert block 724. The coupled signals need not be identical, or even similar in information content or format.

With this configuration, signals conveying charted and uncharted obstacles 810 may be coupled to the block for generation of synthetic images 726. Also database 710 may couple to a conventionally constructed errata database 806 to receive quality of service ("QOS") reports.

Figure 9:
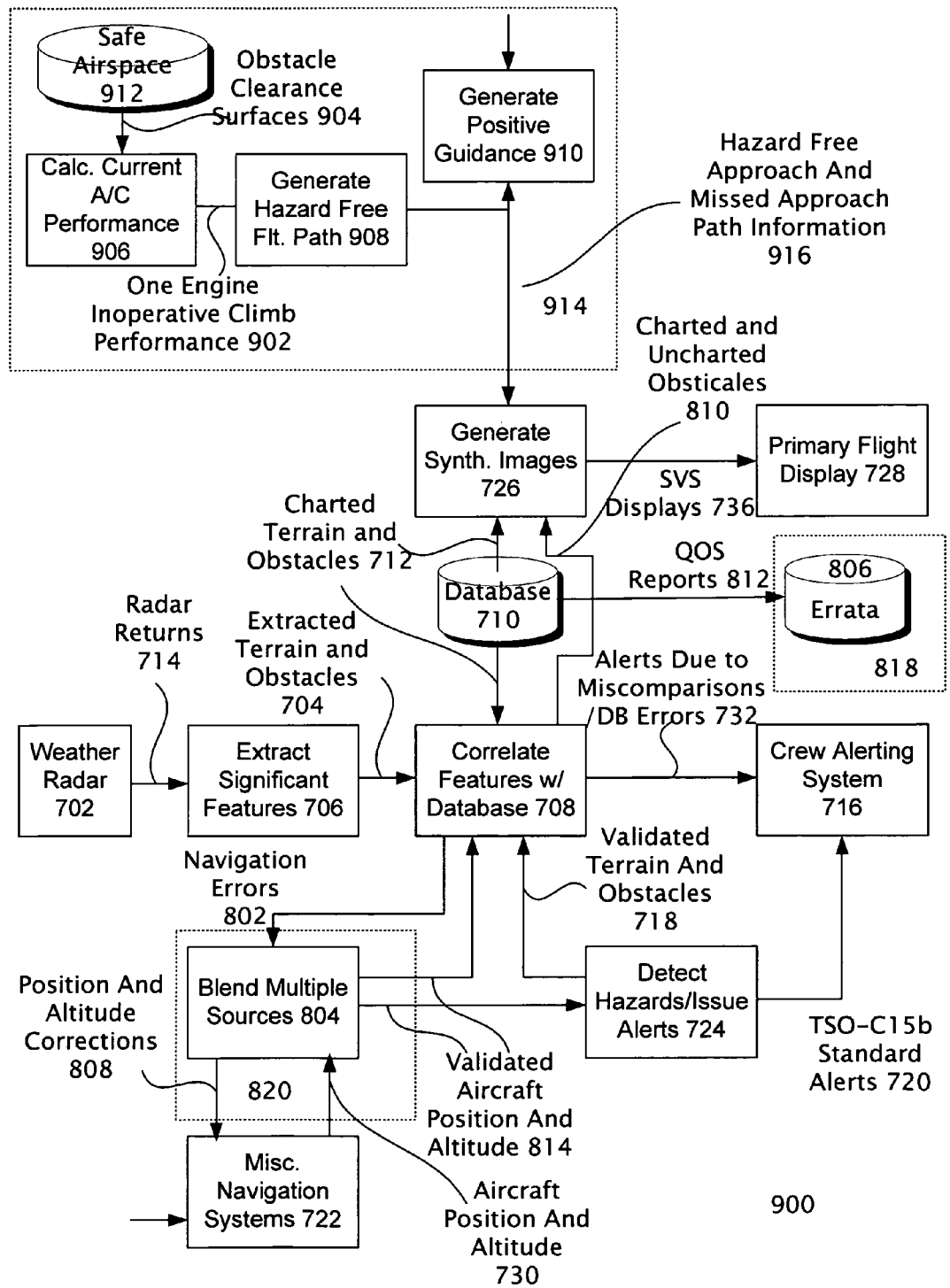
FIG. 9 shows a block diagram of a robust system for precision course guidance and situation awareness implementing precision course guidance.

FIG. 9 shows a block diagram of a robust solution 900 for precision course guidance and situation awareness implementing precision course guidance. Unlike traditional instrument flight rules procedures, the hazard-free path can be generated on an as-needed, just-in-time basis. This can require the system to include a subsystem to validate that the path provides adequate separation from terrain, charted obstacles, restricted airspace, and other limiting features 914. The system typically must also ensure that the missed approach path can be achieved during One Engine Inoperative operations under current atmospheric conditions.

As shown a conventionally constructed safe airspace data base 912 may be coupled to a calculation block of current A/C performance 906 to provide obstacle clearance surfaces. One Engine Inoperative climb performance 902 may be coupled from the calculation block 906 to the generate hazard free flight path block 908. Block 906 and block 908 may equivalently be conventionally constructed, or may also utilize components described or otherwise incorporated in this document. The generation of positive guidance block 910 may be coupled to the generate a hazard free flight path block 908 and the generate synthetic image block 726. The generate positive guidance block 910 may equivalently be conventionally constructed, or may also utilize components described or otherwise incorporated in this document.

Figure 10:
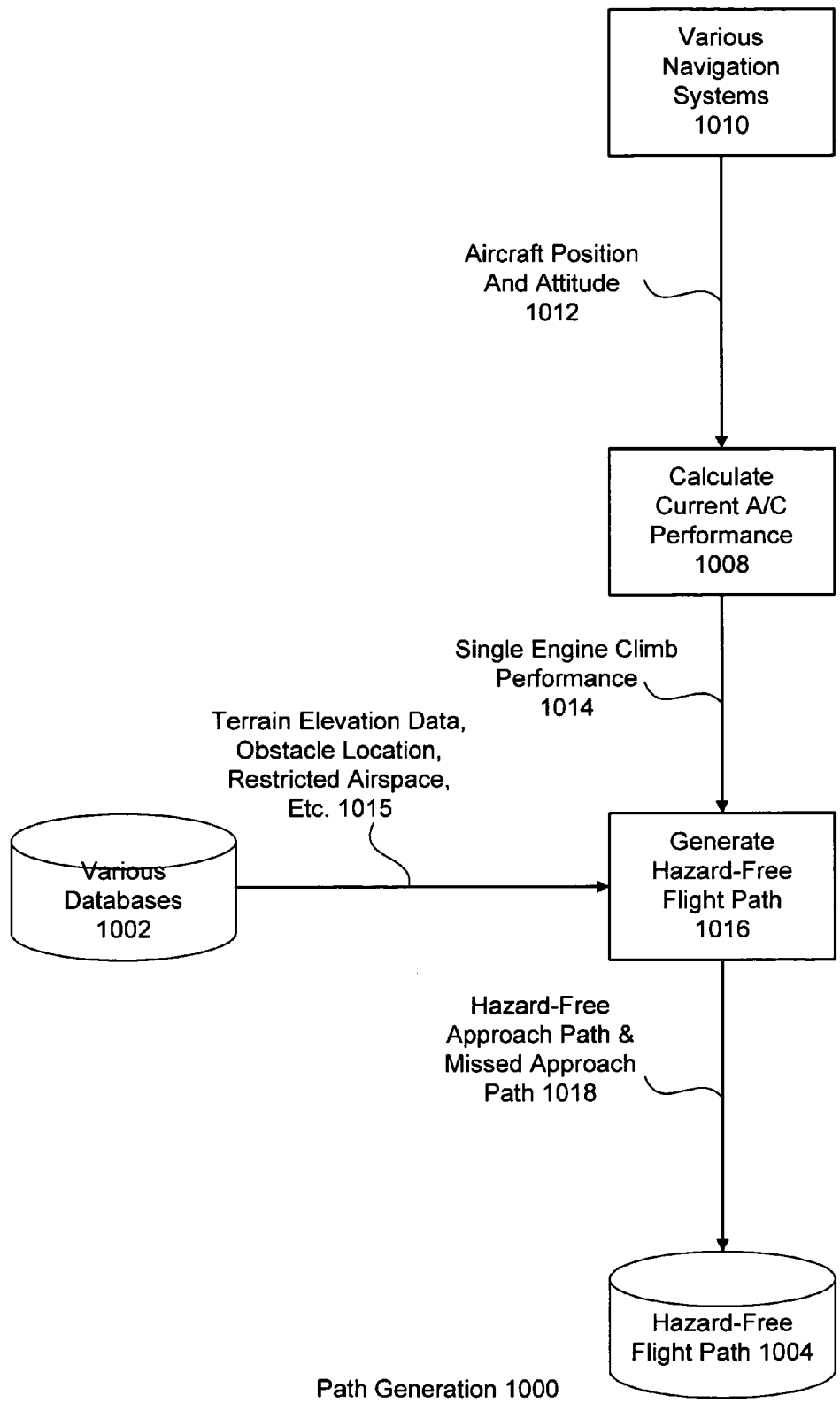
FIG. 10 is a block diagram for a system of path generation which may be utilized in precision course guidance.

FIG. 10 is a block diagram for a system of path generation 1000 which may be utilized in precision course guidance. The system shown aids the process for determining a hazard-free path (604 of FIG. 6) typically utilized in precision course guidance. Path generation typically occurs at some time before final approach.

For landings the path is typically created prior to final approach fix for approach and missed-approach operations. For take off operations the path typically is created prior to take-off (usually during pre-flight operations) for departure. The "generate hazard-free flight path" subsystem may be implemented interactively by the pilot, or by an automated tool that may perform some or all of the path generation.

Various navigation systems 1010 may be coupled to a subsystem to calculate current A/C performance 1008. The information provided to the subsystem 1008 typically includes aircraft position, altitude, and the like 1012. Output from the subsystem calculate current A/C performance 1008 may be coupled to the generate hazard-free flight path subsystem 1016. Information input to the subsystem generate hazard-free flight path 1016, may include One Engine Inoperative climb performance and the like 1014.

A conventionally constructed plurality of various databases 1002 may be coupled to a subsystem for generating a hazard free flight path 1016. Data utilized to generate the hazard-free flight path typically includes terrain elevation data, obstacle location, restricted airspace information, and the like 1015.

Returning to the block generate hazard-free flight path subsystem 1016, its output may be provided to a hazard-free flight path data base 1004, which may be conventionally constructed. Data input to database 1004 may include hazard free approach path information, missed approach path information, and the like 1018.

Figure 11:
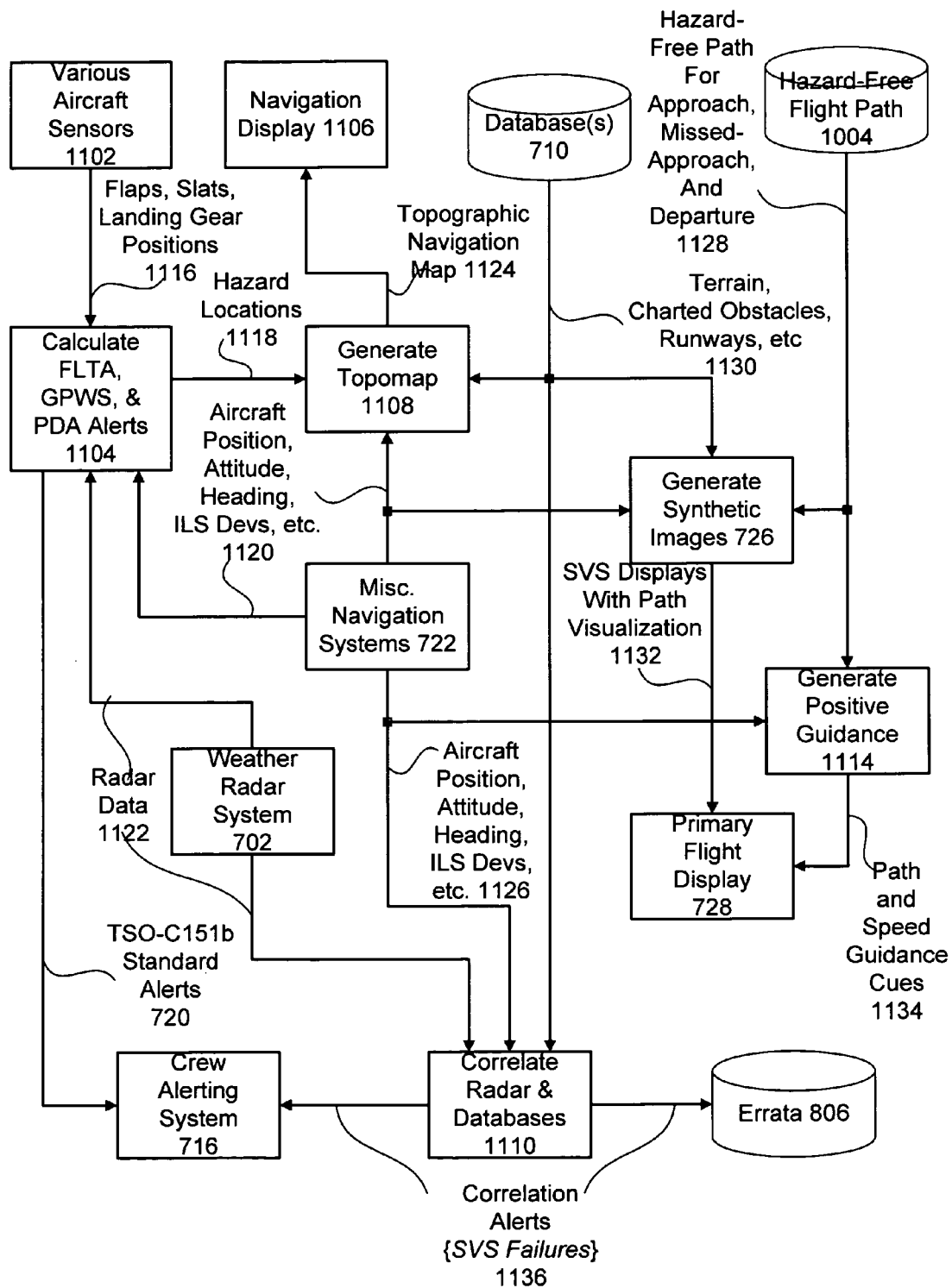
FIG. 11 is a block diagram for an example of a system for providing precision course guidance.

FIG. 11 is a block diagram for an example of a system for providing precision course guidance 1100. Course guidance may be computed from the deviation between the current path of the aircraft and the generated hazard free path. Course guidance can be provided during approach, missed-approach, and departure. Once the path has been created (1000 of FIG. 10), the present system can provide path visualization and guidance cues for the pilot to track the path. Alternatively, the path may be programmed into the automated flight systems, where the pilot can use the path visualization to monitor the performance of the automated flight systems.

Various aircraft sensors 1102, may be coupled 1116 to a subsystem for calculating forward looking terrain alerts ("FLTA"), ground proximity warning system ("GPWS") alerts, premature descent alerts ("PDA") and the like 1104. Coupled information 1116 may include information regarding the status of flaps, slats, gear positions and the like. The subsystem for calculating FLTA, GPWS, PDA alerts and the like 1104, which may provide TSO-C151b alerts 720 to the crew alerting system 716.

The weather radar system 702 may also be coupled to the correlate radar and database 1110, and to the subsystem for calculating FLTA, GPWS, PDA alerts and the like 1104. Radar data 1122 is typically provided. The subsystem for calculating FLTA, GPWS, PDA alerts and the like 1104 may also couple hazard location data 1118 to the subsystem to generate a topographic map 1108. The subsystem to generate a topographic map 1108 is conventionally constructed and may be coupled to a conventional navigation display 1106 to provide a topographic navigation map 1124.

The miscellaneous navigations systems 722 may couple aircraft position, altitude, heading, ILS deviations, and the like 1120 to the subsystem for calculating FLTA, GPWS, PDA alerts and the like 1104. The miscellaneous navigations systems 722 may couple aircraft position, altitude, heading, ILS deviations, and the like 1120 to the subsystem for generating topographic maps 1108. In addition the miscellaneous navigations systems 722 may couple aircraft position, altitude, heading, ILS deviations, and the like 1126 to the generate positive guidance subsystem 1114, and to the correlate radar and database subsystem 1110.

The correlate radar and database subsystem 1110 may also receive information regarding terrain, charted obstacles, runways and the like 1130 from the database 710. Database 710 may also couple information regarding terrain, charted obstacles, runways and the like 1130 to the subsystem generate topographic maps 1108, and to the generate synthetic images subsystem 726. The subsystem generate synthetic images 726 may also couple synthetic vision displays with path visualization 1132 to the primary flight display 728. Returning to the correlate radar and databases subsystem 1110, it may couple correlation alerts (or synthetic vision system alerts) 1136 to the crew alerting system 716 and the errata database 806.

The hazard-free flight path data base 1004 may couple hazard free paths for approach, missed approach, departure and the like 1128 to the generate synthetic images subsystem 726, and to the generate positive guidance subsystem 1114. The generate positive guidance subsystem 1114 may then couple path and speed guidance cues 1134 to the primary flight display 728.

The examples described above may advantageously utilize various components and processes as described in the following patent applications, the content of which is incorporated by reference into this application.

The determination of a hazard free path has been described in the following: U.S. Pat. No. 8,234,058 entitled "System, Module, and Method for Generating Procedure Data used in an Avionics System", U.S. Pat. No. 8,332,083 entitled "System and Method for Generating a Missed Approach Path", and U.S. Pat. No. 8,073,578 entitled "Method and System for the Cursor-Aided Manipulation of Flight Plans in Two and Three Dimensional Displays", the contents of which are incorporated herein by reference.

Real-time detection of terrain and obstacles ("real-time hazard detection") has been as described in the following: U.S. patent application Ser. No. 11/851,323 entitled "System and Method for Sensor-Based Terrain Avoidance", and U.S. Pat. No. 8,234,020 entitled "Systems And Methods For Generating Alert Signals In A Terrain Awareness And Warning System", the contents of which are incorporated herein by reference.

Runway obstacle detection has been described in the following: U.S. Pat. No. 6,850,185 entitled "Runway Obstacle Detection System and Method", U.S. Pat. No. 7,379,014 entitled "Taxi Obstacle Detecting Radar", and U.S. Pat. No. 7,783,427 entitled "Combined Runway Obstacle Detection System And Method", the contents of which are incorporated herein by reference.

Precision vertical navigation ("alternative navigation and guidance solutions") has been described in U.S. patent application Ser. No. 12/221,354 entitled "Precision Navigation For Landing", the contents of which are incorporated herein by reference.

Positive course guidance has been described in the following: U.S. Pat. No. 7,619,556 entitled "System and Method for Synthesizing Localizer and Glide Slope Deviations from Weather Radar", and U.S. patent application Ser. No. 12/283,400 entitled "System, Module, And Method For Generating An Image Of A Flight Route Corridor On A Display Unit", the contents of which are incorporated herein by reference.

Figure 12:
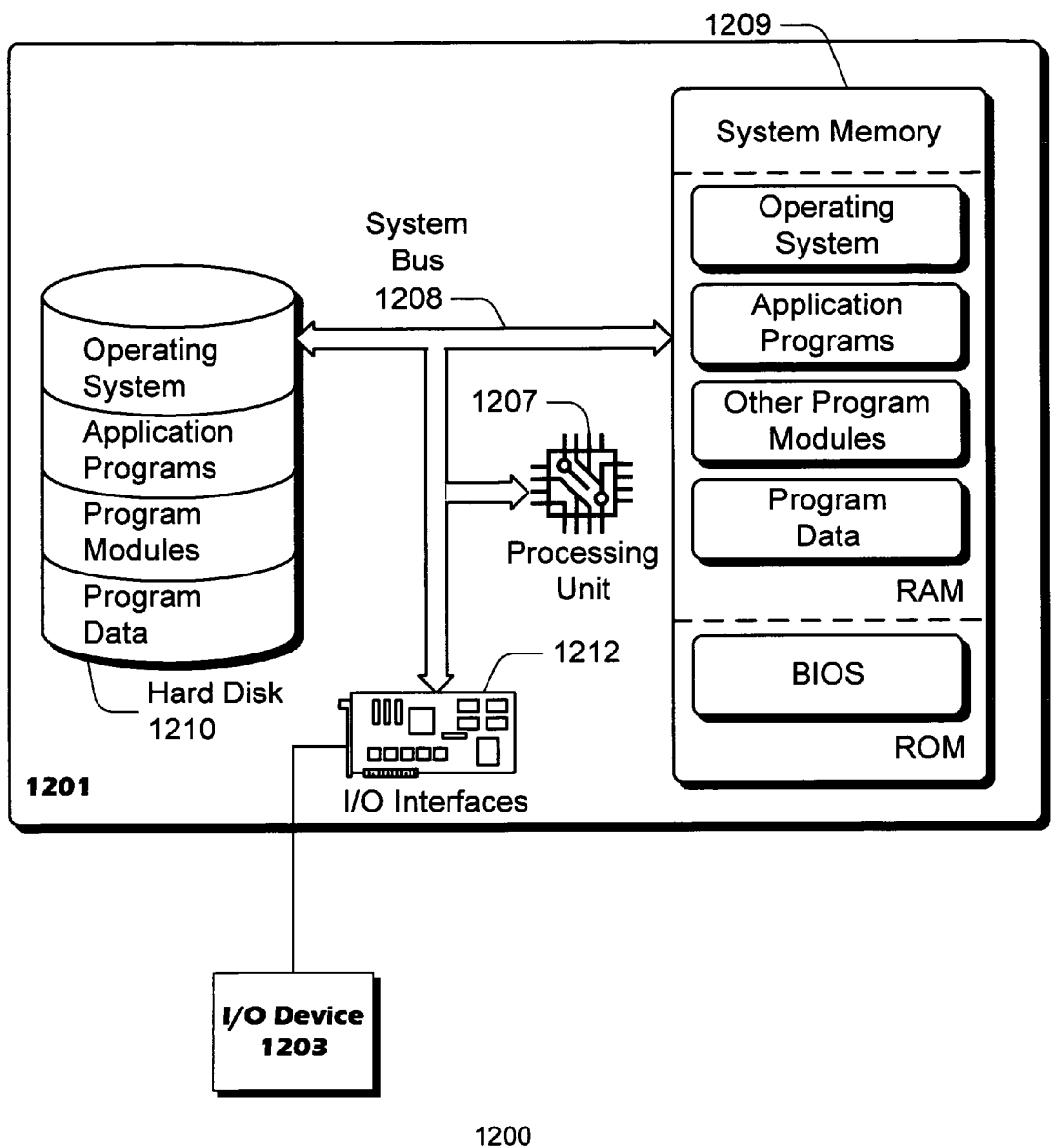
FIG. 12 illustrates an exemplary computing environment in which the precision course guidance described in this application, may be implemented.

FIG. 12 illustrates an exemplary computing environment 1200 in which the precision course guidance described in this application, may be implemented. Exemplary computing environment 1200 is only one example of a computing system and is not intended to limit the examples described in this application to this particular computing environment.

For example the computing environment 1200 can be implemented with numerous other general purpose or special purpose computing system configurations. For example, the computing system may be included in an avionics "black box" containing other avionics components or standing alone. However, the functionality, or processes provided by the examples described may be installed as one or more application programs within a modern Integrated Modular Architecture (i.e. a cabinet) avionics platform. Examples of well known computing systems, may include, microprocessor-based systems, multiprocessor systems, redundant computing systems with cross strapping, and the like.

The computer 1200 includes a general-purpose computing system in the form of a computing device 1201. The components of computing device 1201 can include one or more processors (including CPUs, GPUs, microprocessors and the like) 1207, a system memory 1209, and a system bus 1208 that couples the various system components such as an I/O interface 1203 coupled to the system bus 1208 via an I/O interface 1212. Processor 1207 processes various computer executable instructions, including those to implement precision navigation, to control the operation of computing device 1201 and to communicate with other electronic and computing devices (not shown). The system bus 1208 represents any number of several types of bus structures, including a memory bus or memory controller, a peripheral bus, an accelerated graphics port, and a processor or local bus using any of a variety of bus architectures.

The system memory 1209 includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 1207. Input devices are connected to the processor 1207 via input/output interfaces 1212 that are coupled to the system bus 1208.

Those skilled in the art will realize that the process sequences described above may be equivalently performed in any order to achieve a desired result. Also, sub-processes may typically be omitted as desired without taking away from the overall functionality of the processes described above.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method of providing precision course guidance, such method comprising:
   performing the following elements, where such elements are performed by a processor installed in an aircraft system:
   generating a hazard-free path from data retrieved from at least one database, where
   the hazard-free path is a path free from a plurality of charted hazards defined with fixed locations;
   displaying the hazard-free path and the plurality of charted hazards on at least one flight deck display;
   generating egocentric guidance cues that enable a pilot to fly the hazard-free path;
   displaying the egocentric guidance cues with the display of the hazard-free path and the plurality of charted hazards;
   detecting at least one uncharted hazard defined by a fixed location with at least one onboard, real-time sensor;
   generating a notification of database error when at least one uncharted hazard is detected; and
   sending the notification of database error to an onboard crew alerting system, whereby
   at least one alert corresponding to the database error is presented to the pilot.

2. The method of claim 1, wherein the hazard-free path is a path of a final approach procedure.

3. The method of claim 1, wherein the hazard-free path is a path of a missed approach procedure.

4. The method of claim 1, wherein one onboard, real-time sensor is comprised of a weather radar system configured to extract features of terrain and obstacles.

5. The method of claim 1, wherein the generating the hazard-free path is implemented interactively by the pilot.

6. The method of claim 1, wherein the generation of the hazard free path is implemented through a fully-automated process.

7. The method of claim 1, wherein at least one database is configured to store terrain and obstacle information.

8. The method of claim 1, wherein at least one database is configured to store airspace information.

9. The method of claim 1, wherein at least one database is configured to store location and elevation information of a restricted airspace near the airport.

10. The method of claim 1, wherein each unknown hazard is detected by a TSO-C151b compliant terrain awareness and warning system.

11. The method of claim 10, wherein the TSO-C151b compliant terrain awareness and warning system processes inputs from a weather radar system to detect imminent conflicts with terrain and obstacles along the projected path of the aircraft.

12. The method of claim 1, further wherein a radar correlation system is configured to compare radar return signals with data stored in the plurality of the databases to detect a missing or erroneous database content.

13. A method of generating precision course guidance, such method comprising:
  performing the following elements, where such elements are performed by a processor installed in an aircraft system:
    determining a published instrument approach procedure of an airport runway, where
      the published instrument approach procedure is comprised of a final approach procedure and a missed approach procedure, where
        the final approach procedure is comprised of
          a final approach fix,
          a published minimum descent altitude or published decision altitude, and
          a missed approach point, and
        the missed approach procedure originates from the missed approach point;
    calculating a first obstacle-free path from the published minimum descent altitude or the published decision altitude to a new decision altitude;
    calculating a second obstacle-free path from the new decision altitude to a published intersection of the missed approach procedure, where
      the second obstacle-free path intercepts the missed approach procedure at a safe operating altitude clear of known hazards near the airport;
    generating precision lateral and vertical course guidance; and
    providing the precision lateral and vertical course guidance to a flight display, thereby
      providing lateral and vertical course guidance to a flight crew to track the first and second obstacle-free paths.

14. The method of claim 13, further comprising:
  initiating complex maneuvers to achieve the safe operating altitude.

15. The method of claim 13, wherein the precision lateral and vertical course guidance is provided on the flight display presenting a synthetic scene of terrain and obstacles.

16. A device for providing precision course guidance, such device comprising:
  a processor installed in an aircraft system and configured to
    determine a published instrument approach procedure of an airport runway, where
      the published instrument approach procedure is comprised of a final approach procedure and a missed approach procedure, where
        the final approach procedure is comprised of
          a final approach fix,
          a published minimum descent altitude or published decision altitude, and
          a missed approach point, and
        the missed approach procedure originates from the missed approach point;
    calculate a first obstacle-free path from the published minimum descent altitude or the published decision altitude to a new decision altitude;
    calculate a second obstacle-free path from the new decision altitude to a published intersection of the missed approach procedure, where
      the second obstacle-free path intercepts the missed approach procedure at a safe operating altitude clear of known hazards near the airport;
    generate precision lateral and vertical course guidance; and
    provide the precision lateral and vertical course guidance to a flight display, thereby
      providing lateral and vertical course guidance to a flight crew to track the first and second obstacle-free paths.

17. The device of claim 16, wherein
the processor is further configured to
  initiate complex maneuvers to achieve the safe operating altitude.

18. The device of claim 17, wherein the precision lateral and vertical course guidance is provided on the flight display presenting a synthetic scene of terrain and obstacles.

* * * * *